W. D. Harrell,
Potato Digger.

No. 112,592. Patented Mar. 14, 1871.

Attest
H. C. Stineback
John R. Tempirley

Inventor
W. D. Harrell
by A. M. Connett & Bro.

United States Patent Office.

WILLIAM D. HARRELL, OF MOORE'S HILL, INDIANA.

Letters Patent No. 112,592, dated March 14, 1871.

IMPROVEMENT IN POTATO-DIGGERS.

The Schedule referred to in these Letters Patent and making part of the same.

*To all whom it may concern:*

Be it known that I, WILLIAM D. HARRELL, of Moore's Hill, in the county of Dearborn and State of Indiana, have invented an Improved Potato-Digger; and I do hereby declare that the following is a full and exact description of the same, reference being had to the accompanying drawing making part of this specification—

Figure 1:
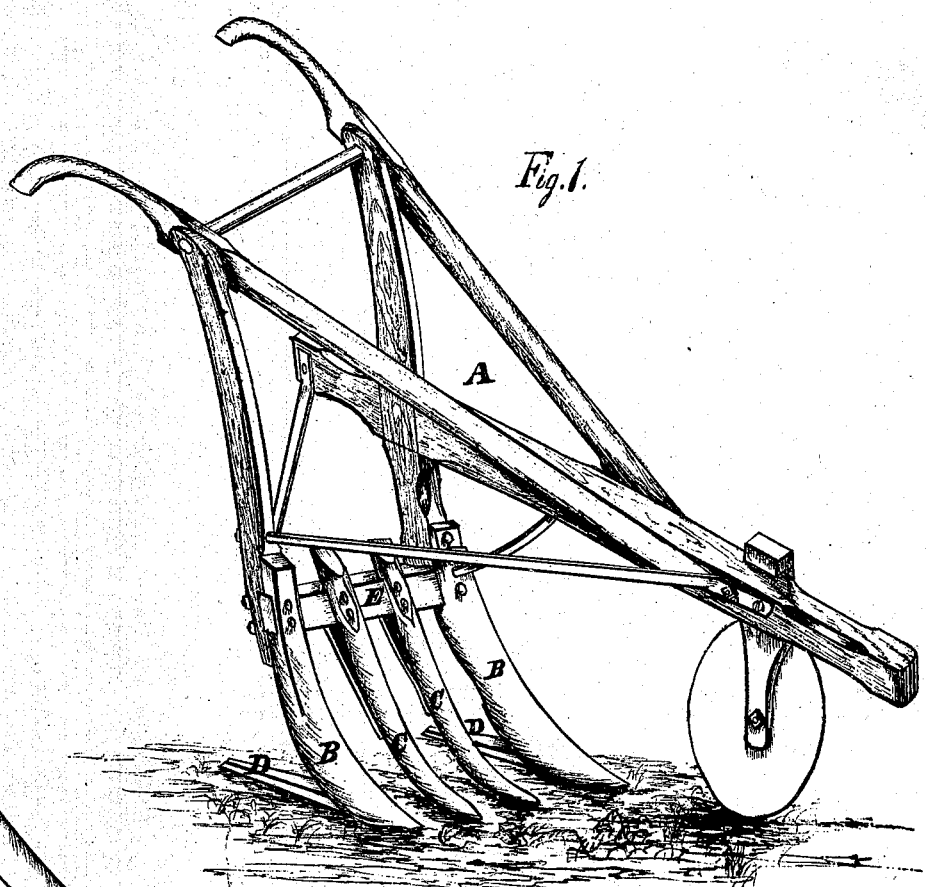

Figure 1 being a perspective view of the implement.

Figure 2:
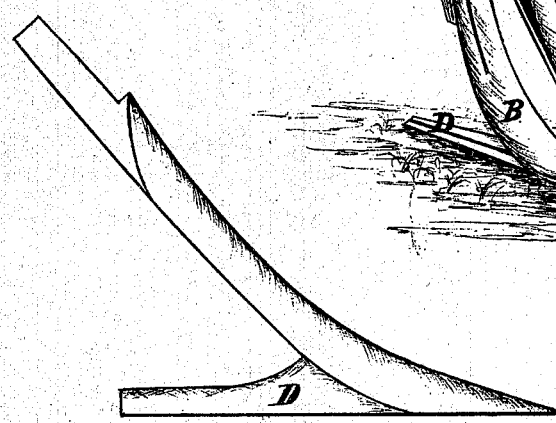

Figure 2, a view of the cultivator-tooth.

Like letters designate corresponding parts in both the figures.

The principal object of this invention is to combine in a simple and efficient manner the two implements named in the title, viz., a cultivator and potato-digger, and to give the machine a side draft, so that the horse may be driven between the rows of potatoes instead of on them, as in the ordinary way.

Another feature of the invention consists in providing the outer teeth of the implement with heels, as shown in the drawing, so that the implement may stand upright when not in use.

Let A represent the frame of the implement, constructed similar to a plow;

E, a bar, with teeth B B attached rigidly thereto; and

C C, teeth secured thereto and removable at will.

The outer teeth B B are provided with heels D D, for the purpose of holding the machine upright when not in use.

The two center teeth C C of the digger are plain.

The arrangement shown in fig. 1 represents a potato-digger.

When it is desired to use it as a cultivator, the two center teeth C C are removed, and the tooth shown in fig. 2 inserted in their place, thus forming a very efficient cultivator.

The machine is braced in the usual manner, and is provided with a circular cutter for separating vines and roots.

Having thus described my invention,

What I claim as new, and desire to secure by Letters Patent, is—

A potato-digger, provided with teeth B B (having heels D D) rigidly secured to the bar E, and the interchangeable and removable teeth designated by C C, and the one shown in fig. 2, all arranged in the manner shown, and for the purposes specified.

WILLIAM D. HARRELL.

Witnesses:
H. CONNETT, Jr.,
A. M. CONNETT.